United States Patent
Oka et al.

(10) Patent No.: US 9,442,297 B2
(45) Date of Patent: Sep. 13, 2016

(54) STEREOSCOPIC DISPLAY APPARATUS HAVING LIQUID CRYSTAL LENS, WHICH PITCHES ARE CHANGEABLE ACCORDING TO A POSITION OF AN OBSERVER

(71) Applicant: Japan Display Inc., Minato-ku, Tokyo (JP)

(72) Inventors: Shinichiro Oka, Hitachi (JP); Shinichi Komura, Mobara (JP)

(73) Assignee: Japan Display Inc., Tokyo (JP)

( * ) Notice: Subject to any disclaimer, the term of this patent is extended or adjusted under 35 U.S.C. 154(b) by 270 days.

(21) Appl. No.: 13/956,472

(22) Filed: Aug. 1, 2013

(65) Prior Publication Data

US 2014/0036174 A1    Feb. 6, 2014

(30) Foreign Application Priority Data

Aug. 1, 2012  (JP) .................. 2012-171211

(51) Int. Cl.
*G02B 27/22* (2006.01)
*G02B 26/08* (2006.01)
*H04N 13/04* (2006.01)

(52) U.S. Cl.
CPC ....... *G02B 27/2214* (2013.01); *G02B 26/0875* (2013.01); *H04N 13/0404* (2013.01); *H04N 13/0475* (2013.01)

(58) Field of Classification Search
CPC .............. G02B 27/2214; G02B 3/14; H04N 13/0404; G02F 1/29; G02F 2001/294; G02F 1/134309
See application file for complete search history.

(56) References Cited

U.S. PATENT DOCUMENTS 5,493,427 A *  2/1996  Nomura ................ G02B 3/005
                                              348/59
2011/0128456 A1*  6/2011  Son ................... G02F 1/133526
                                              349/15

(Continued)

FOREIGN PATENT DOCUMENTS

| CN | 102436100 A | 5/2012 |
| CN | 102497563 A | 6/2012 |

(Continued)

OTHER PUBLICATIONS

Office Action dated Jul. 27, 2015 regarding a corresponding Chinese Patent Application No. 201310335396.0.

(Continued)

*Primary Examiner* — Huyen Ngo
(74) *Attorney, Agent, or Firm* — Typha IP LLC

(57) ABSTRACT

A stereoscopic display apparatus comprising: a display element, a liquid crystal lens being set in front of the display element. The liquid crystal lens comprises a first electrode made of a plane-like transparent electrode, and a second electrode having plural comb-like transparent electrodes, a liquid crystal layer is held between the first electrode and the second electrode. A pitch of the liquid crystal lens is changed, by changing the pattern of voltage to be applied to the comb-like transparent electrodes, an individual voltage according to the pattern of voltage is applied to each of the plural comb-like transparent electrodes, the pitch of the liquid crystal lens is changed depending on a position of an observer with respect to the stereoscopic display panel, in front/back direction. Thus, the stereoscopic display apparatus can provide proper images even as a viewer moves in the front/back direction with respect to the stereoscopic display panel.

7 Claims, 13 Drawing Sheets

(56) References Cited

U.S. PATENT DOCUMENTS

| | | | | |
|---|---|---|---|---|
| 2011/0157497 A1* | 6/2011 | Kim | ............... | G02B 27/2214 349/15 |
| 2011/0292306 A1* | 12/2011 | Kim | ............... | G02B 27/2214 349/5 |

FOREIGN PATENT DOCUMENTS

| | | |
|---|---|---|
| CN | 102591089 A | 7/2012 |
| JP | 07-072445 | 3/1995 |
| JP | 7-72445 | 3/1995 |
| JP | 2010-282090 | 12/2010 |
| JP | 2011-095369 | 5/2011 |

OTHER PUBLICATIONS

Korean Office Action for Korean Patent Application No. 10-2013-90943, issued on Jun. 27, 2014.

\* cited by examiner

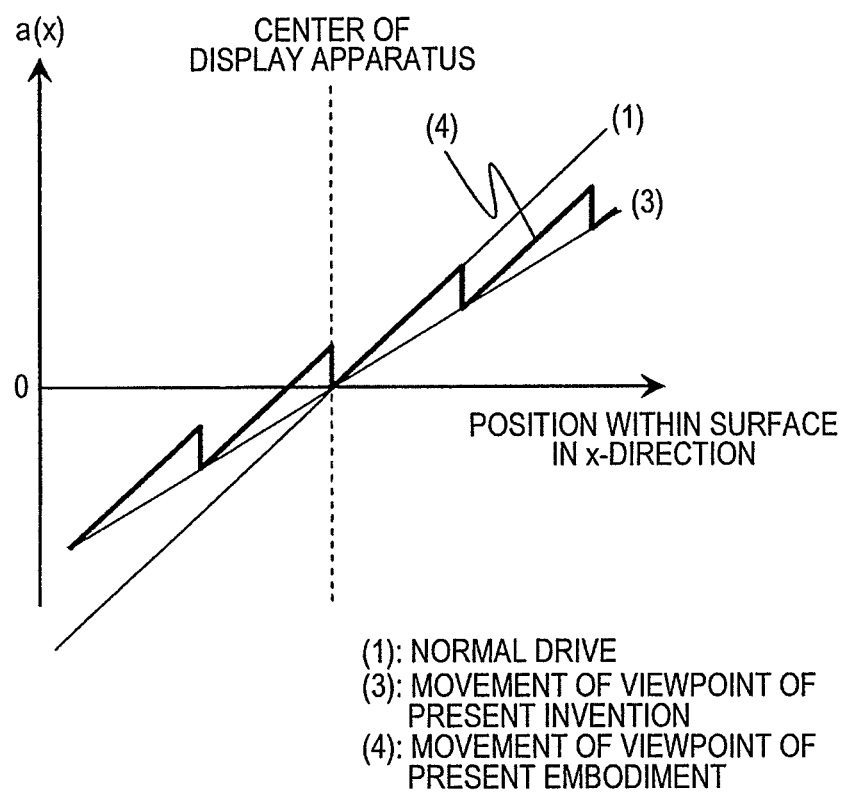

STEREOSCOPIC DISPLAY APPARATUS HAVING LIQUID CRYSTAL LENS, WHICH PITCHES ARE CHANGEABLE ACCORDING TO A POSITION OF AN OBSERVER

CLAIM OF PRIORITY

This application claims priority from Japanese patent application JP2012-171211 filed on Aug. 1, 2012, the content of which is incorporated by reference into this application.

BACKGROUND OF THE INVENTION

1. Field of the Related Art

The present invention relates to a stereoscopic display apparatus of naked-eye type, for enabling to display a 3D image, without applying special glasses.

2. Description of the Related Art

The stereoscopic display apparatuses can be classified, roughly, into a one applying the glasses, presenting pictures differing from each other to eyes on the left and right sides, and the other for giving a stereoscopic effect to the naked eyes as they are, without using the glasses. In the stereoscopic display apparatus of the naked-eye type without using the glasses, having the structure for entering lights to the left and right-side eyes, separately, there are proposed ones of applying therein parallax barriers and lenticular lenses, etc.

A three-dimensional liquid crystal display (3D LCD) apparatus, applying a liquid crystal lens therein, has a problem that a viewpoint thereof is fixed, and due to fixing of the viewpoint, a position from where the 3D can be seen is also fixed. For dissolving such problem, it is proposed to move a position of the liquid crystal lens.

In the following Japanese Patent Laid-Open No. Hei 7-72445 (1995) is disclosed a 3D display apparatus, being characterized by comprising: a display means for displaying plural numbers of parallax images differing from each other; an optical means, being attached to the display means and constructed with an alley of cylindrical lenses, and also being able to change optical characteristics of the cylindrical lenses; a detector means for detecting a spatial position of a head portion of an observer; and a controller means, being connected with the detector means, for controlling the optical means, so that a 3D image is reproduced at a most appropriate position for the head portion, upon basis of positional information of the head portion, which is detected by the detector means (in claim 1).

SUMMARY OF THE INVENTION

In the Japanese Patent Laid-Open No. Hei 7-72445 (1995), while disposing plural numbers of electrodes on an optical characteristic variable lens, changing of a pattern of voltage to be applied to an electrode alley moves the lens position of the liquid crystal lens, i.e., moves the position of the viewpoint from where the 3D image can be seen. However, although the position of the viewpoint from where the 3D image can be seen can be moved to the left or the right, with respect to the display panel; but it is still fixed in a front/back position thereof, i.e., cannot be moved in the front/back direction.

According to the present invention, an object thereof is to provide a stereoscopic display apparatus for enabling to widen a range from where the 3D image can be seen, with bringing the position of viewpoint to be movable, not only to the left and the right, but also into the front/back directions.

For dissolving such problem as mentioned above, according to the present invention, there is provided a stereoscopic display apparatus, with applying a stereoscopic display panel therein, comprising: a display element, which is configured to display parallax images for a left-side eye and a right-side eye, simultaneously; and a liquid crystal lens, which is attached onto the display element and configured to adjust a direction of a light emitting from the display element, wherein a pitch of the liquid crystal lens is changed depending on a position of an observer with respect to the stereoscopic display panel, in front/back direction thereof.

In the stereoscopic display apparatus, according to the present invention, further comprising: an observer position detecting unit, which is configured to detect the position of the observer; and a liquid crystal lens driving unit, which is configured to drive the liquid crystal lens, wherein it is preferable that the liquid crystal lens driving unit changes the pitch of a pattern of voltage to be applied onto plural numbers of electrodes of the liquid crystal lens, depending on the position of the observer, which is detected by the observer position detecting unit.

Also, in the stereoscopic display apparatus, according to the present invention, it is preferable that the observer position detecting unit detects positions of eyes or a position of a face of the observer.

Also, in the stereoscopic display apparatus, according to the present invention, it is preferable that the observer position detecting unit further detects positions of the observer in left/right directions thereof, and the liquid crystal lens driving unit moves the pattern of the voltage to be applied onto the plural numbers of electrodes of the liquid crystal lens, depending on the detected positions of the observer in the left/right direction thereof.

Also, in the stereoscopic display apparatus, according to the present invention, it is preferable that the liquid crystal lens comprises a first electrode made of a plane-like transparent electrode, and a second electrode having plural number of comb-like transparent electrodes, so as to hold a liquid crystal layer between the first electrode and the second electrode, and the pitch of the liquid crystal lens is changed, by changing a pitch of the electrodes to be applied with the voltage, among the plural numbers of comb-like second electrode.

Also, in the stereoscopic display apparatus, according to the present invention, it is preferable that the pitch of the liquid crystal lens is changed, by changing the pitch of the electrodes to be applied with the voltage, uniformly.

Also, in the stereoscopic display apparatus, according to the present invention, it is preferable that the pitch of the liquid crystal lens is changed, by changing the pitch of the electrodes to be applied with the voltage, discontinuously.

Also, in the stereoscopic display apparatus, according to the present invention, it is preferable that a small distribution of refractive index is moved, little by little, within the lens pitch.

Also, in the stereoscopic display apparatus, according to the present invention, it is preferable that the liquid crystal lens has a polarization plate on an emitting side thereof, and rotates by 90 degrees between an axis of incident polarized light and an axis of emitting polarized light, under condition where no voltage is applied thereon, and the light is shut off by a liquid crystal layer and the polarization plate, on the second electrode, onto which high voltage is applied, while the light passes therethrough, on the second electrode other than that, under condition the voltage is applied thereon.

According to the present invention, it is possible to move the position of viewpoint, not only to the left and the right, but also into the front/back directions, by changing a lens pitch of the liquid crystal lens. And then, the range from where the 3D image can be seen can be widened.

BRIEF DESCRIPTION OF THE DRAWINGS

Those and other objects, features and advantages of the present invention will become more readily apparent from the following detailed description when taken in conjunction with the accompanying drawings wherein:

FIG. 10 is a view for explaining the characteristics of the liquid crystal lens, according to the embodiment 2 of the present invention;

DETAILED DESCRIPTION OF THE INVENTION

Figure 1:
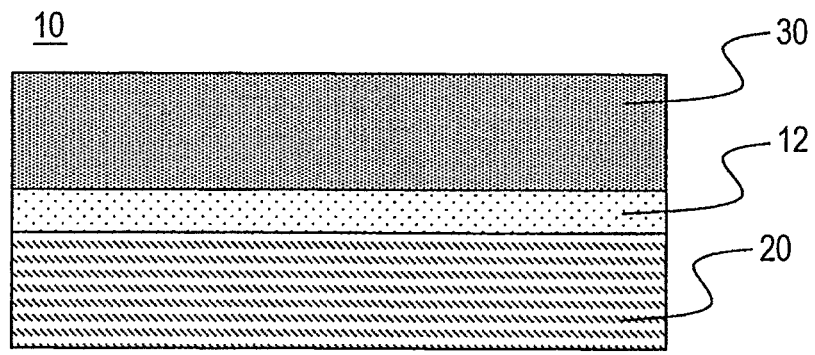
FIG. 1 is a cross-section view for showing the structure of a stereoscopic display panel, according to an embodiment 1 of the present invention.

Hereinafter, embodiments according to the present invention will be fully explained by referring to the drawings attached herewith. In each drawing, a same reference numeral is attached with the same constituent element, and therefore a repetitive explanation thereof will be omitted herein.

First Embodiment

FIG. 1 shows an outline cross-section view of the stereoscopic display panel, according to an embodiment 1 of the present invention. The stereoscopic display panel 10 is made up with a display element 20 and a liquid crystal lens 30, wherein the display element 20 and the liquid crystal lens 30 are bonded by a bonding material 12. As the display element 20 may be applied a liquid crystal display (LCD) element, preferably, and may be applied a liquid crystal display element of an IPS (In-Plane Switching) method, for example. As the display element may be applied a display element, applying an organic EL therein, or other display element(s) than that. However, since it is necessary to enter a linearly polarized light upon the liquid crystal lens 30, a polarization plate or a phase difference plate may be provided, preferably, between the display element 20 and the liquid crystal lens 30, in particular, in case of that other than the liquid crystal display element.

Figure 2:
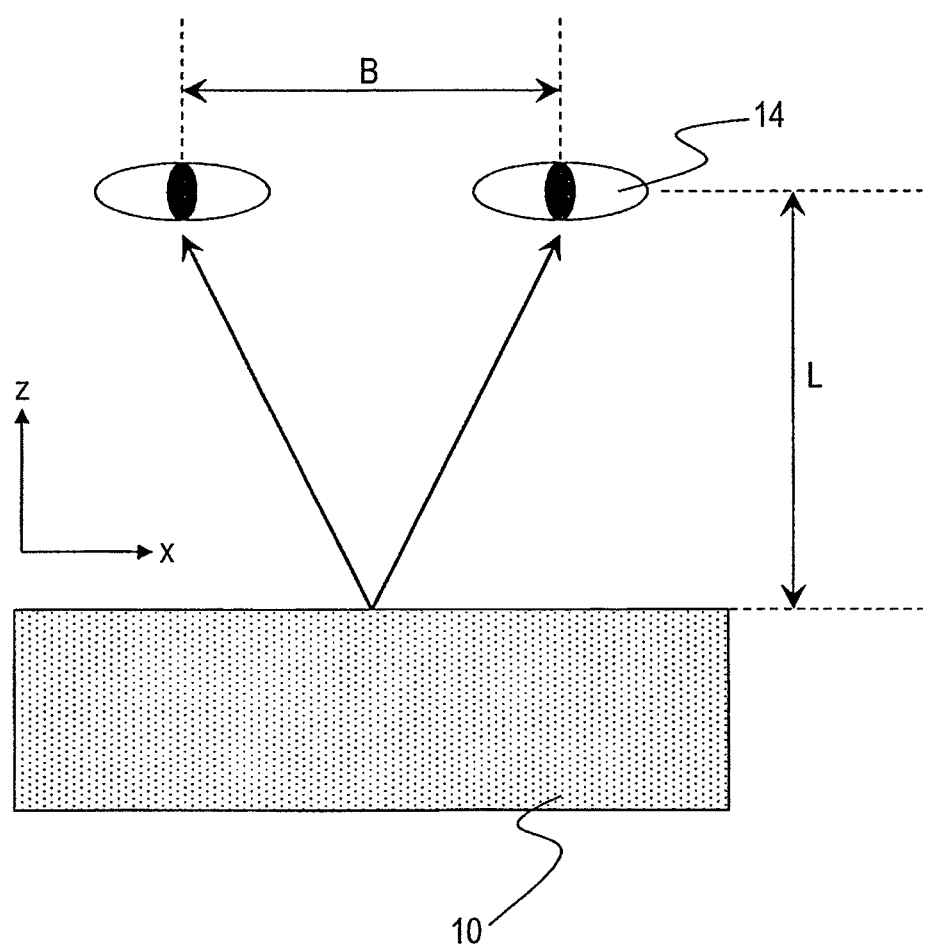
FIG. 2 is a view for showing a relationship between the stereoscopic display panel, according to the embodiment 1 of the present invention, and eyes of an observer.

FIG. 2 shows an outline of a 3D display of naked-eye type. The 3D display of naked-eye type displays a 3D image, by entering pictures or images having parallax therebetween, from the stereoscopic display panel 10 onto the left and the right-side eyes 14 of an observer. As is shown in the figure, it is assumed in the following explanation, that a distance between the stereoscopic display panel 10 and the left and the right-side eyes 14 of the observer is "L", a distance between the left and the right-side eyes 14 is "B", respectively. Also, an axis in the horizontal direction with respect to the stereoscopic display panel 10 is assumed to be "x-axis" while an axis in the direction of front/back to be "z-axis".

Figure 3:
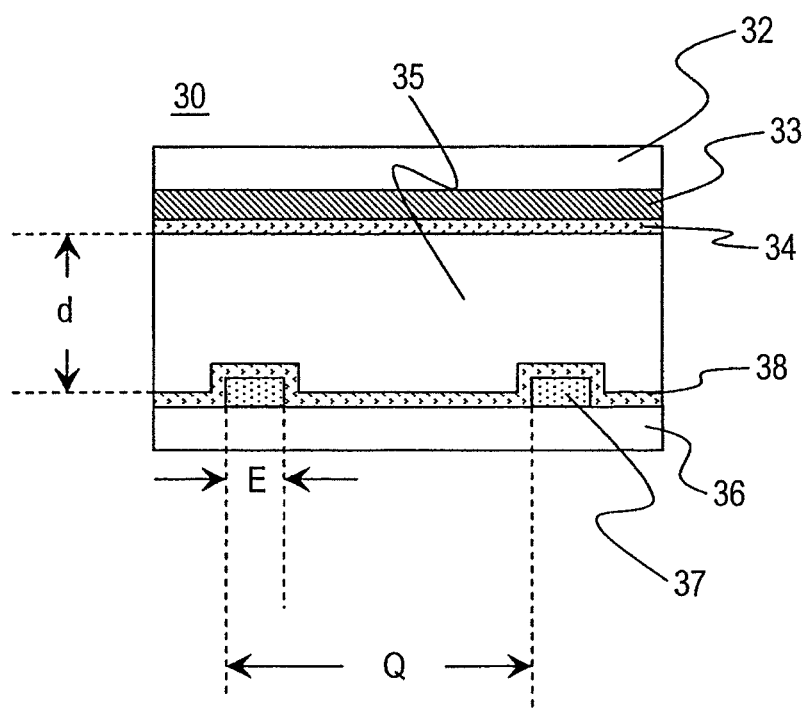
FIG. 3 is a cross-section view for showing an outline structure of a liquid crystal lens, according to the embodiment 1 of the present invention.

FIG. 3 shows a cross-section view of an outline of an example of the liquid crystal lens 30. On a first substrate 32 made of a transparent material is provided a first electrode 33, being made of a plane-like transparent electrode, and on that is provided an orientation film 34. Also, on a second substrate 36 made of a transparent material is provided a second electrode 37, being made of a comb-like transparent electrode, and on that is provided an orientation film 38. And, the first substrate 32 and the second substrate 36 are disposed in such a manner that the respective orientation films 34 and 38 face to each other while putting a liquid crystal 35 between them.

Herein, the orientation film 34 and 38 is made of polyimide, for example, and they orient the liquid crystal 35 into the horizontal direction. And, the liquid crystal 35 has a positive permittivity orientation. (However, the liquid crystal may have a negative permittivity orientation, so that the orientation film orients it in the vertical direction.)

As is shown in the figure, a pitch of the second electrode 37 presents a pitch of lens, and is presented by "Q". Also, width of the electrode, in particular, of the second electrode 37 is assumed to be "E", while thickness of a liquid layer (i.e., distance between the orientation films 34 and 38) to be "d".

Figure 4A:
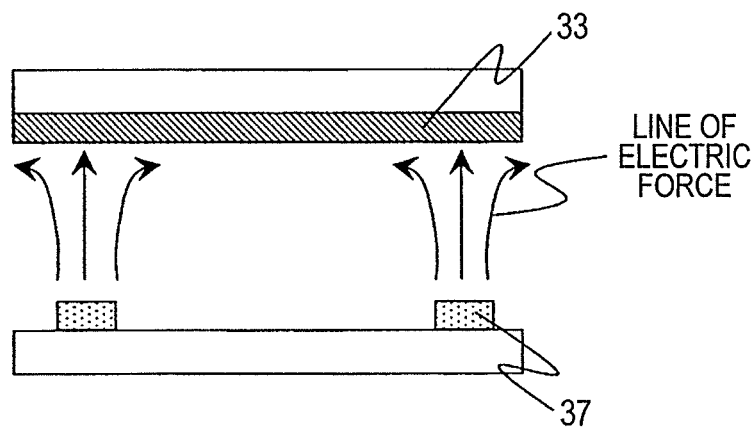
FIG. 4A is a view for explaining an operation of the liquid crystal lens, according to the embodiment 1 of the present invention, in particular, showing distribution of an electric field.
Figure 4B:
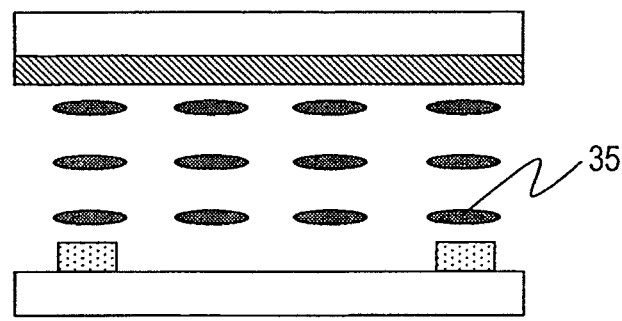
FIG. 4B is a view for explaining the operation of the liquid crystal lens, according to the embodiment 1 of the present invention, in particular, showing an orientation of liquid crystal when no voltage is applied thereon.
Figure 4C:
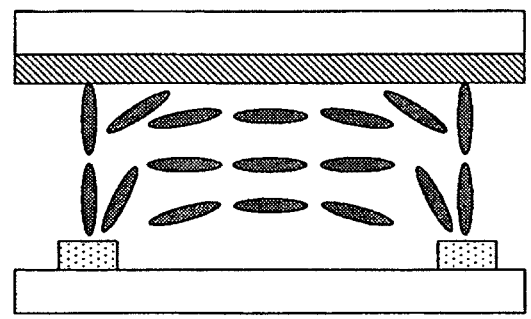
FIG. 4C is a view for explaining the operation of the liquid crystal lens, according to the embodiment 1 of the present invention, in particular, showing the orientation of liquid crystal after applying the voltage thereon.

FIG. 4A-4C show an orientation of the liquid crystal, in particular, when the liquid crystal lens 30 shown in FIG. 3 is driven. FIG. 4A shows an orientation of electric field when voltage is applied between the first electrode 33 and the second electrode 37. Thus, there is produced a line of electric force directing from the second electrode 37 to the first electrode 33. FIG. 4B shows an initial orientation of the liquid crystal where no voltage is applied between the first electrode 33 and the second electrode 37. Molecules of the liquid crystal are oriented into the horizontal direction. FIG. 4C shows an orientation of the liquid crystal after application of the voltage thereon. The molecules of the liquid crystal are oriented into the vertical direction. In FIG. 4C, a portion, where the molecules of the liquid crystal are oriented into the vertical direction on the second electrode, is small in the refractive index, while a portion, where the molecules of the liquid crystal are oriented into the horizontal direction between the second electrode, is high in the refractive index, with respective to the light polarized into a direction of the x-axis.

In the figures, although a homogeneous orientation is shown as the initial orientation of the liquid crystal; however, the present invention should not be limited only to this. For example, it may be a twisted orientation, as far as there can be produced distribution of the refractive index. Also, regarding the direction of the orientation, although it is oriented in perpendicular to a direction of a longitudinal side of the electrode, in FIG. 4B; however, the present invention should not be limited only to this.

Next, explanation will be given on a method for designing the liquid crystal lens. The following equation (Eq. 1) shows a relationship between the lens pitch and pixel the pitch of the display element.

$$Q = \frac{2P}{1 + P/B} \quad \text{(Eq. 1)}$$

Herein, "Q" represents the lens pitch, "P" the pixel pitch of the display element, and "B" the distance between the eyes of a human, i.e., about 65 mm. Herein, the pixel pitch is defined as a unit for displaying a picture or an image for the right-side eye (or the left-side eye). For example, when displaying the images for the left-side eye and the right-side eye, alternately, then for each pixel, a size of the pixel is the pixel pitch. Also, when displaying the images on the left and the right, alternately, for each sub-pixel (i.e., R or G or B), the size of the sub-pixel is the pixel pitch.

It is possible to determine the lens pitch from the pixel pitch, upon basis of the equation (Eq. 1).

Next, explanation will be given on a method for shifting or moving a viewpoint with applying the liquid crystal lens, by referring to FIGS. 5A to 7. The method for moving the viewpoint with applying the liquid crystal lens is described in the Japanese Patent Laid-Open No Hei 7-72445 (1995) mentioned above, for example.

Figure 5A:
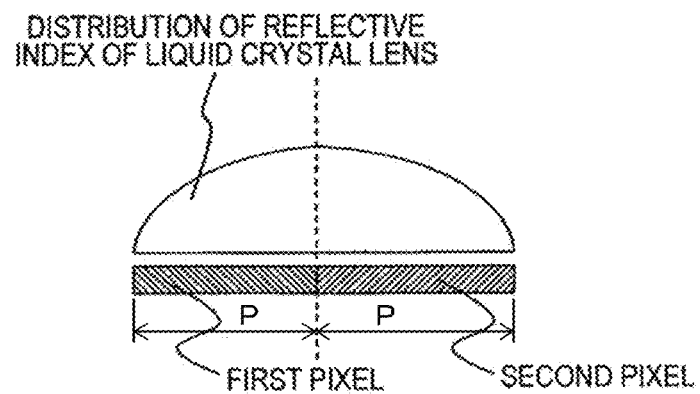
FIG. 5A is a view for showing a relationship between a liquid crystal lens and a pixel at a center of the display panel.
Figure 5B:
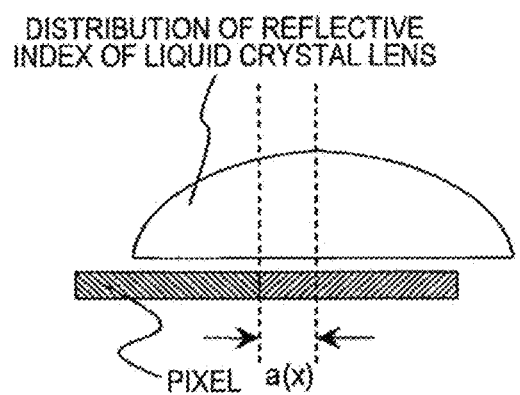
FIG. 5B is a view for showing a relationship between a liquid crystal lens and a pixel at an end of the display panel.

FIGS. 5A and 5B show positional relationships between the liquid crystal lens and the display pixel. FIG. 5A shows a positional relationship between the pixel at a center of the display panel and the distribution of refractive index of the liquid crystal lens. In the figure, a first pixel and a second pixel display the images for use of the left and the right-side eyes, respectively. Designing is made in such a manner that, a central position of the liquid crystal lens corresponds or fits to a boundary defined between the first pixel and the second pixel at the center of the display panel. However, shifting of a little bit may be produced, sometimes, because the shifting is produced, actually, in disposition of the display panel, etc.

FIG. 5B shows a positional relationship between the pixel and the distribution of refractive index of the liquid crystal lens, at an end of the display panel. As can be seen from the equation (Eq. 1), since the lens pitch "Q" is smaller than 2-times of the pixel pitch, shifting is produced in the positional relationship between the pixel and the liquid crystal lens, as is close to the end of the display panel. An amount of that shifting is defined as "a(x)".

Figure 6:
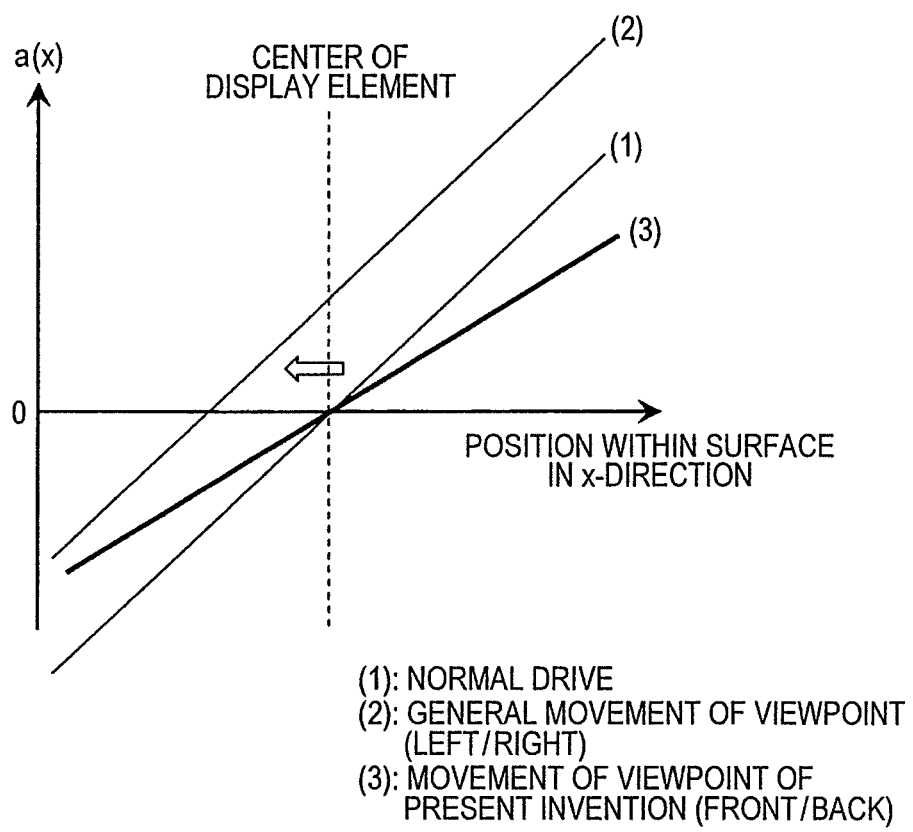
FIG. 6 is a view for showing a relationship of a shifting amount with respect to a position within a surface in "x" direction of the display panel.

FIG. 6 shows the shifting amount "a(x)", which is defined in FIGS. 5A and 5B, with respect to the position within a surface of the display element in the x-direction. In the figure, the position shown by a dotted line corresponds to a central position of the display element.

A characteristic curve (1) shows the shifting amount "a(x)", which is calculated from the equation (Eq. 1). In this instance, at the center of the display element, it is desirable for "a(x)" to be zero (0), as is shown in FIG. 5A, and if the "a(x)" is zero (0), the central position of the display element is a most appropriate viewing position. An inclination of this characteristic curve (1) is determined by the equation (Eq. 1).

Crosstalk can be reduced down, at the most, on a front surface of the display panel, under the condition of the characteristic curve (1), and also at the most appropriate viewing position, which is determined by the following equation (Eq. 2).

$$L = \frac{BD}{P} \quad \text{(Eq. 2)}$$

Where "L" presents the most appropriate viewing position and "D" the distance from the liquid crystal layer of the display apparatus up to the liquid crystal layer of the liquid crystal lens, respectively.

When a viewpoint is moved in the horizontal direction, as is shown by a characteristic curve (2), the characteristic curve (1) is shifted into the x-direction while keeping the inclination thereof. With doing this, the most appropriate viewing position is shifted into the x-direction depending on an amount of the movement thereof.

According to the present invention, the relationship of the shifting amount is determined, with respect to the position within the surface of the display panel in the x-direction, like a characteristic curve (3). Thus, as is shown by the characteristic curve (3), the "a(x)" is zero (0) at the center of the display element, and if only the inclination is changed from that of the characteristic curve (1), then the most appropriate viewing position moves only into a z-direction, i.e., the front/back direction.

Also, but not shown in the figures, if changing the inclination from that of the characteristic curve (1), as well as, moving it in the horizontal direction, then the most appropriate viewing position moves into the x-direction (i.e., the horizontal direction) and also the z-direction (i.e., the front/back direction).

Figure 7:
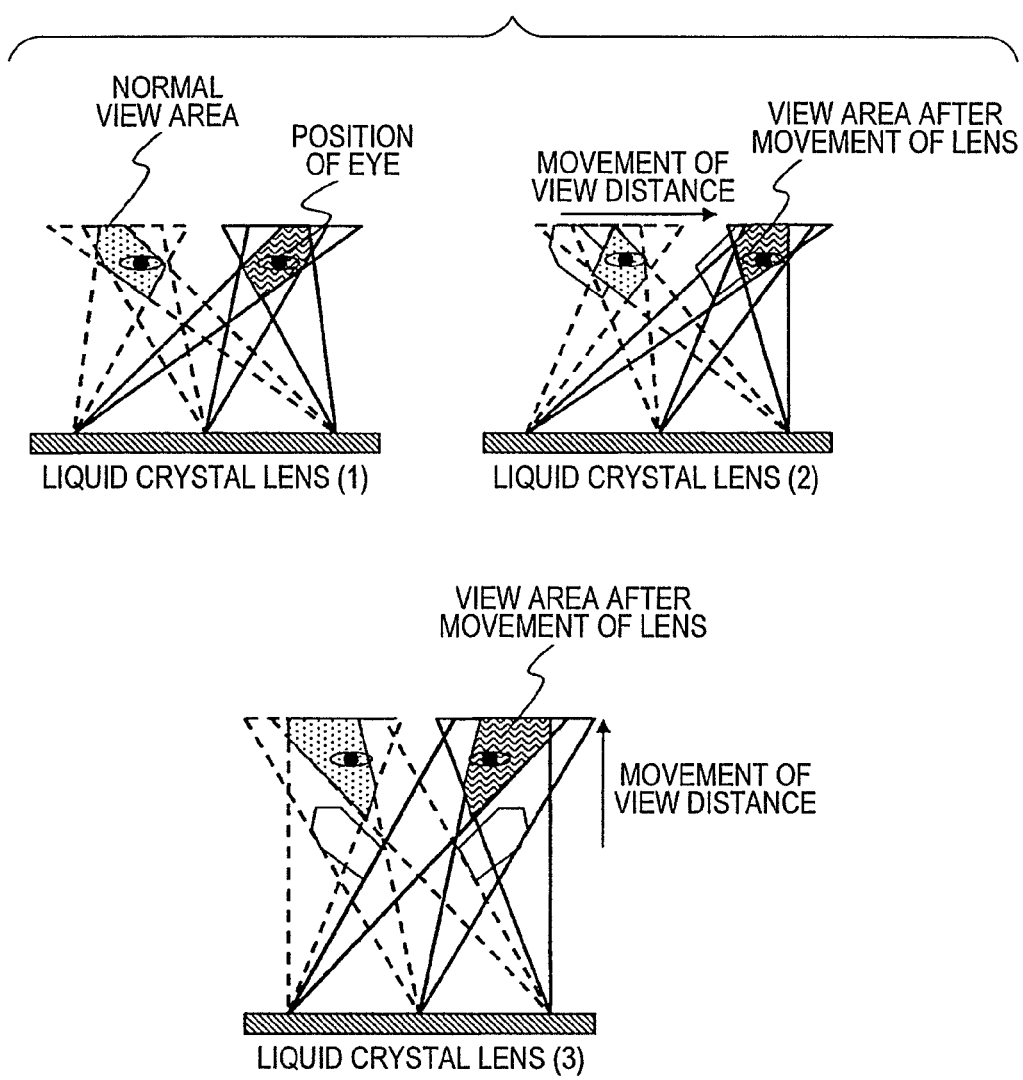
FIG. 7 is a view for explaining a movement of view distance, due to change of the characteristics of the liquid crystal lens.

FIG. 7 shows a movement of the viewpoint, when designing a lens fitting to such characteristic curves (1)-(3) as shown in FIG. 6. An area treated with hatching is a spatial region where a 3D view can be made with a low crosstalk, being called a "view area". If coming out from the equation (Eq. 1), the crosstalk is increased up, but in case of the liquid crystal lens, since the region where the crosstalk is decreased down is relatively wide, and since it is equal to or greater than 5° in an angle if trying to suppress equal to or less than 5%, then an ill effect on the crosstalk is small even if coming out from the equation (Eq. 1).

In case of the characteristic curve (2) of the liquid crystal lens, the view area is shifted (or moves) in the horizontal direction.

In case of the characteristic curve (3) of the liquid crystal lens, since it is small in the inclination comparing to that of the characteristic curve (1), then the shifting amount "a(x)" comes to be small, and the lens pitch "Q" comes to be large. For this reason, the distribution of refractive index of the liquid crystal lens comes to be gentle, i.e., the view distance is shifted in such a direction that it is far from the display panel in the direction of the z-axis, and the position after being shifted comes to be a view area.

Figure 8A:
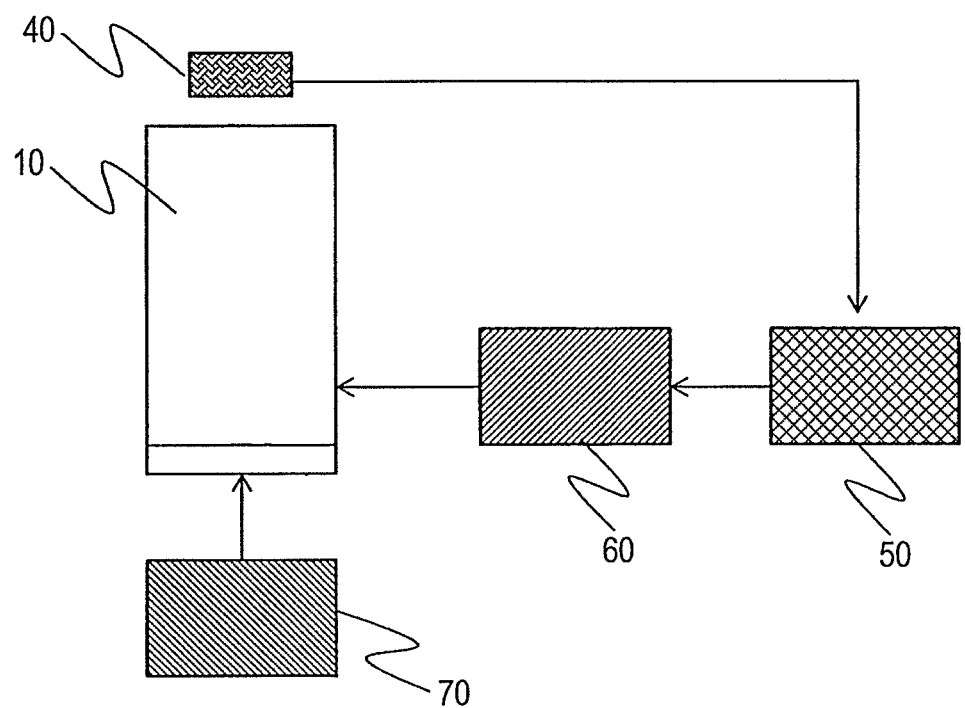
FIG. 8A is a view for showing an outline block structure of the stereoscopic display panel according to the embodiment 1 of the present invention.
Figure 8B:
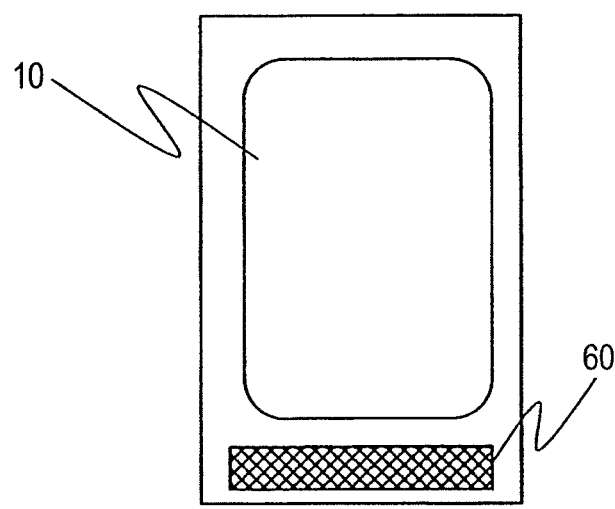
FIG. 8B is a view for showing an outline structure of the stereoscopic display panel according to the embodiment 1 of the present invention.

FIG. 8A shows an outlook block structure view of the stereoscopic display apparatus, according to the present embodiment. This comprises a detection camera 40 for detecting a position of the observer. The detection camera 40 detects positions of the eyes and the face of the observer, for example. The detection camera 40 may be constructed together with the stereoscopic display panel 10, in one body, or may be constructed, separately. An observer position detecting means 50 calculates out a signal presenting the left/right positions and the front/back positions of the observer, upon basis of videos, which are picked up by the detecting camera. A liquid crystal lens driver 60 outputs a signal for driving the liquid crystal lens within the stereoscopic display panel 10, upon basis of the signal presenting the left/right positions and the front/back positions of the observer. However, the liquid crystal lens driver 60 and so on, as is shown in FIG. 8B, are built up, normally, together with the stereoscopic display panel 10. As the means for detecting the position of the observer may be an appropriate one of position detecting means, not to be limited only to the camera, but also others, such as, that for receiving a reflected infrared ray while irradiating the infrared ray on the observer, and that for detecting a generating electric field while attaching a magnetic field generator onto the observer, etc.

With provision of the detector for detecting the position of the face and the positions of the eyes of the face, such as, on a display equipment (for example, a mobile telephone or a television, etc.), mounting the stereoscopic display apparatus according to the present invention, upon basis of the position information obtained, and through adjusting the position and the inclination of the characteristic curve shown in FIG. 6, it is possible to obtain the 3D image having less crosstalk, at an arbitrary position of the face. Herein, the inclination of the characteristic curve can be adjusted, through changing the pitch of the liquid crystal lens, uniformly.

Second Embodiment

The stereoscopic display apparatus, according to an embodiment 2, will be explained by referring to FIGS. 9A to 10.

Figure 9A:
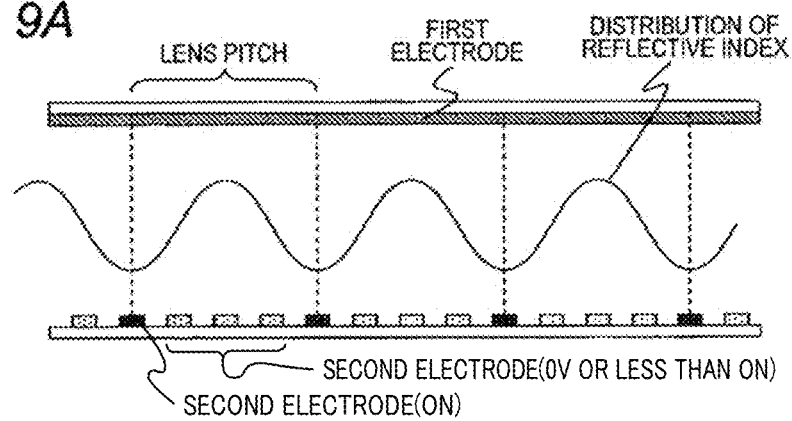
FIG. 9A is a view for showing the structure of the liquid crystal lens, according to an embodiment 2 of the present invention, in particular, when applying high voltage onto a second electrode at a predetermined pitch.
Figure 9B:
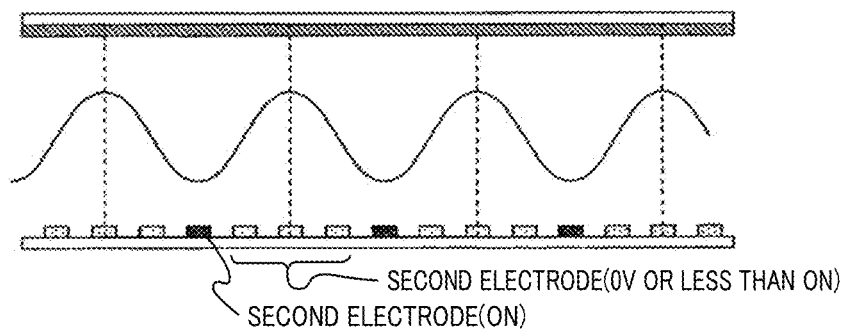
FIG. 9B is a view for showing the structure of the liquid crystal lens, according to the embodiment 2 of the present invention, in particular, when changing the position to be applied with the high voltage in the horizontal direction.
Figure 9C:
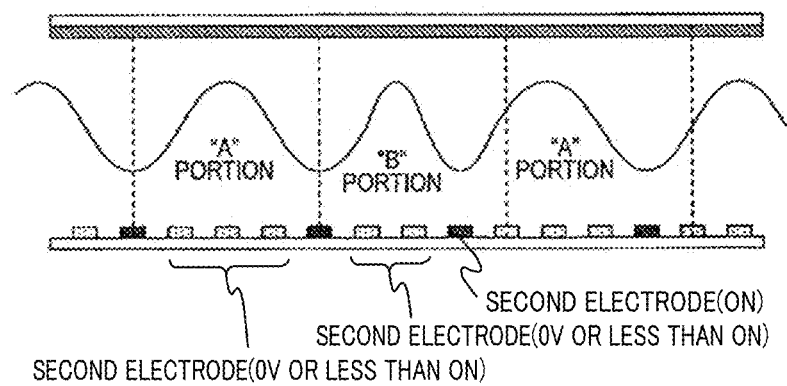
FIG. 9C is a view for showing the structure of the liquid crystal lens, according to the embodiment 2 of the present invention, in particular, when making a lens pitch discontinuous.

FIGS. 9A to 9C show cross-section views of the liquid crystal lens, according to the present embodiment. A first electrode is made from the transparent electrode, and a second electrode is made from the comb-like transparent electrode, respectively. And, a distance from a dotted line to a dotted line in the figure presents one pitch of the lens.

For example, as is shown in FIG. 9A, with applying the highest voltage on the second electrode (on) at a predetermined pitch, while applying the most suitable voltage lower than that or zero Volt on the other second electrode, it is possible to obtain such a preferable distribution of refractive index, as is shown in the figure. Herein, the distribution of refractive index means one obtained through averaging the refractive indexes in the z-direction at a certain position. It is already known that a lens effect comes to the best when the distribution of refractive index be a quadratic curve in a half of each lens pitch. Thus, in FIG. 9A, it can be seen that a lens of one cycle is disposed in one pitch of lens.

On the other hand, for the purpose of moving the viewpoint for implementing the characteristic curve (2) shown in FIG. 6, the position of the second electrode, to be applied with the highest voltage, is changed into the horizontal direction. As is shown in FIG. 9B, with applying the voltage on the second electrode, the distribution of the refractive index is shifted, and the most appropriate viewing position moves in the x-direction (i.e., the horizontal direction) depending on the distance of the movement.

FIG. 9C shows the structure when applying the voltage on the second electrode, according to the second embodiment. The lens pitch is constant in those FIGS. 9A and 9B; however, in FIG. 9C, the pitch of "B portion" is smaller than that of "A portion"; i.e., the lens pitch is discontinuous. By changing the position of the second electrode to be applied with the highest voltage thereon, it is possible to change the lens pitch to be discontinuous.

FIG. 10 shows a characteristic curve of the present embodiment, of the shifting amount "a(x)" with respect to the position within the surface of the display panel in the x-direction. With applying the structure of applying the voltage on the second electrode, as shown in FIG. 9C, it is possible to create such characteristic, as the characteristic curve (4) shown in FIG. 10. With doing this, it is possible to achieve a discontinuous pitch of the liquid crystal lens, and thereby to approach it to the characteristic curve (3), with which the viewpoint can be moved in the front/back directions.

Third Embodiment

Explanation will be made on the stereoscopic display apparatus, according to an embodiment 3 of the present invention, by referring to FIGS. 11A and 11B, and 12A and 12B.

Figure 11A:
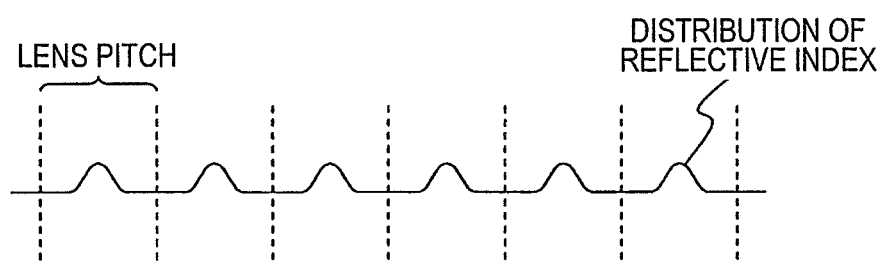
FIG. 11A is a view for explaining the distribution of refractive index of the liquid crystal lens, according to an embodiment 3 of the present invention, in particular, where no movement is made of viewpoint.

In the embodiment 3, a small lens is formed within the lens pitch of the liquid crystal lens. In case where the viewpoint is at the central position thereof, the distribution of refractive index is brought to be as shown in FIG. 11A, for enabling to obtain a small lens effect. With doing this, it is possible to obtain a 3D view in the vicinity of a center of the panel, at the most appropriate viewing position, which is determined by the equation (Eq. 2).

Figure 11B:
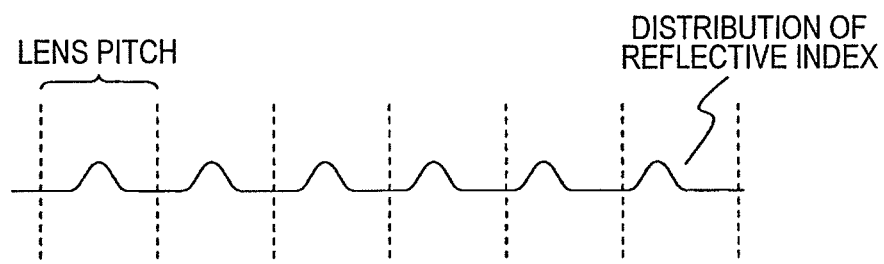
FIG. 11B is a view for explaining the distribution of refractive index of the liquid crystal lens, according to the embodiment 3 of the present invention, in particular, where the movement is made of viewpoint.

On the other hand, as is shown in FIG. 11B, through shifting a small distribution of refractive index, little by little, within the lens pitch, it is possible to make up the condition of such characteristic curve (3), as shown in FIG. 6, without changing the lens pitch. As a result of this, it is possible to move the most appropriate viewing position into the z-direction (i.e., the front/back directions). Also, though not shown in the figures, this can be moved into the x-direction, through shifting the central position of the distribution of refractive index as a whole of the panel.

Figure 12A:
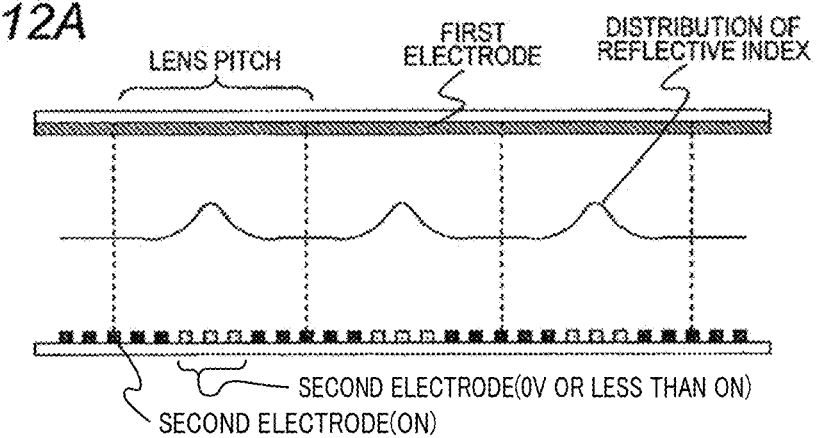
FIG. 12A is a view for explaining the structure of the liquid crystal lens, according to the embodiment 3 of the present invention, in particular, where no movement is made of viewpoint.
Figure 12B:
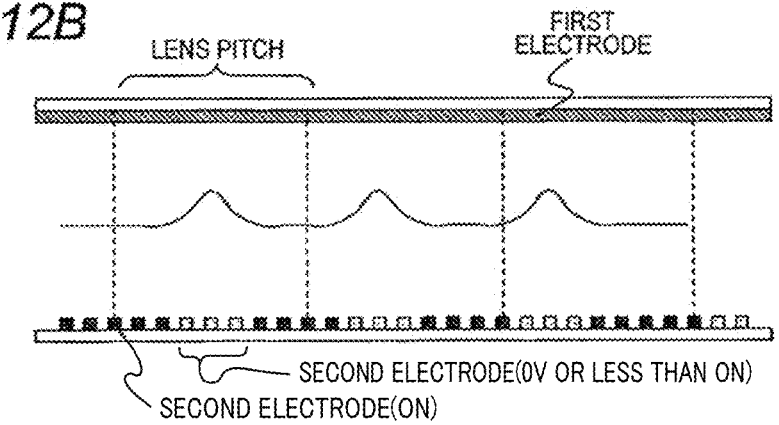
FIG. 12B is a view for explaining the structure of the liquid crystal lens, according to the embodiment 3 of the present invention, in particular, where the movement is made of viewpoint.

FIGS. 12A and 12B show the structure of electrodes for achieving the distribution of refractive index shown in FIGS. 11A and 11B. However, for approaching the distribution of refractive index to a target one, it is preferable that the second electrode is as thin as possible in the pitch thereof. As is shown in FIG. 12A, with applying the highest voltage on the second electrode (on) while applying the suitable voltage lower than that or zero Volt on the other second electrode(s), it is possible to a preferable distribution of refractive index. However, in FIG. 12A, the second electrode (on) defines one pitch by five pieces thereof, but the present invention should not be restricted to this.

FIG. 12B shows the position to be applied with the highest voltage, when moving the most appropriate viewing position in the z-direction (i.e., the front/back directions). As is shown in FIG. 12B, by changing the position of the second electrode to be applied with the highest voltage, it is possible to shift the central position of the distribution of refractive index.

Fourth Embodiment

Explanation will be made on the stereoscopic display apparatus, according to an embodiment 4 of the present invention, by referring to FIGS. 13 and 14.

Figure 13:
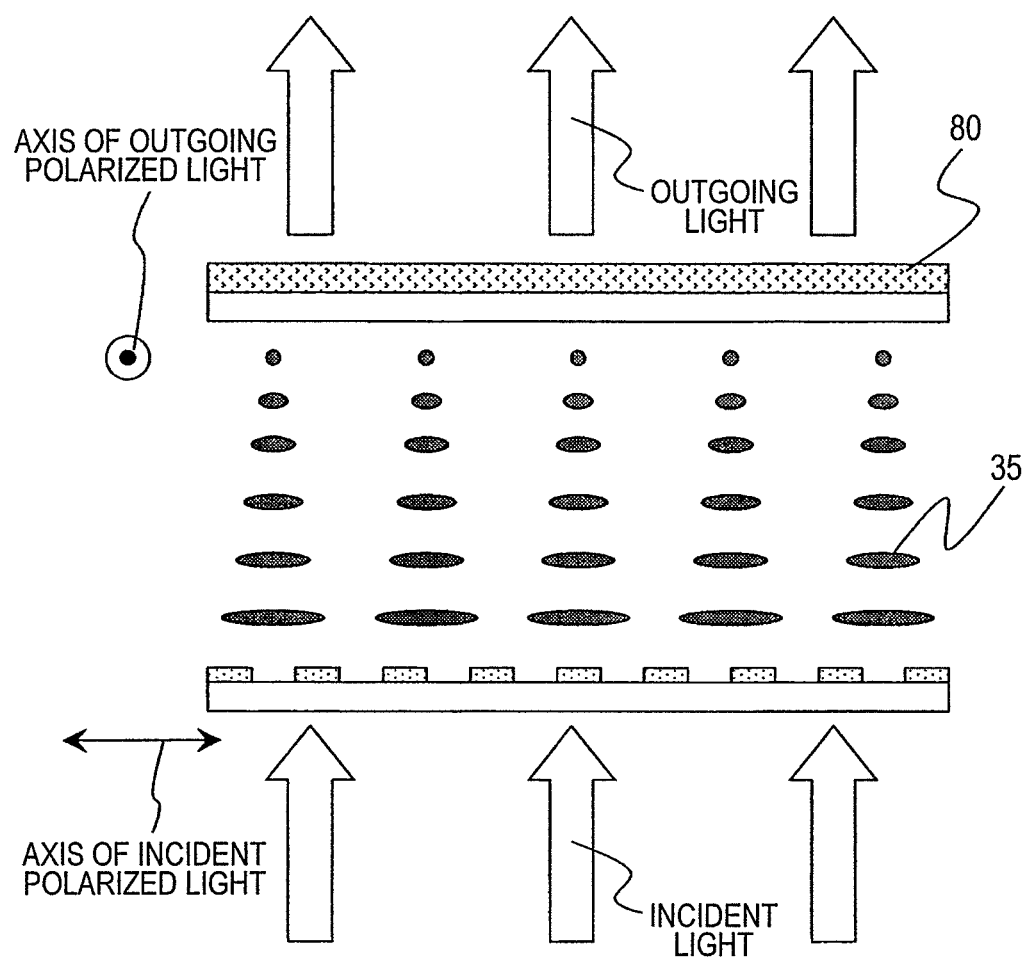
FIG. 13 is a view for explaining an operation of the liquid crystal lens, according to an embodiment 4 of the present invention.

FIG. 13 is a cross-section view for showing an orientation direction of the liquid crystal when no voltage is applied on the liquid crystal lens. An initial orientation shows a twisted orientation of 90 degrees. A light incident upon the liquid crystal lens is linearly polarized (i.e., the liner polarization). And, due to optical rotation of the twisted orientation, the linearly polarized light is rotated by 90 degrees. The liquid crystal lens of the present embodiment has a polarization plate 80, on an emitting side thereof, and a transmission axis thereof defines about 90 degrees with respect to the incident polarized light. For this reason, the light can pass therethrough when no voltage is applied on the liquid crystal lens.

Figure 14:
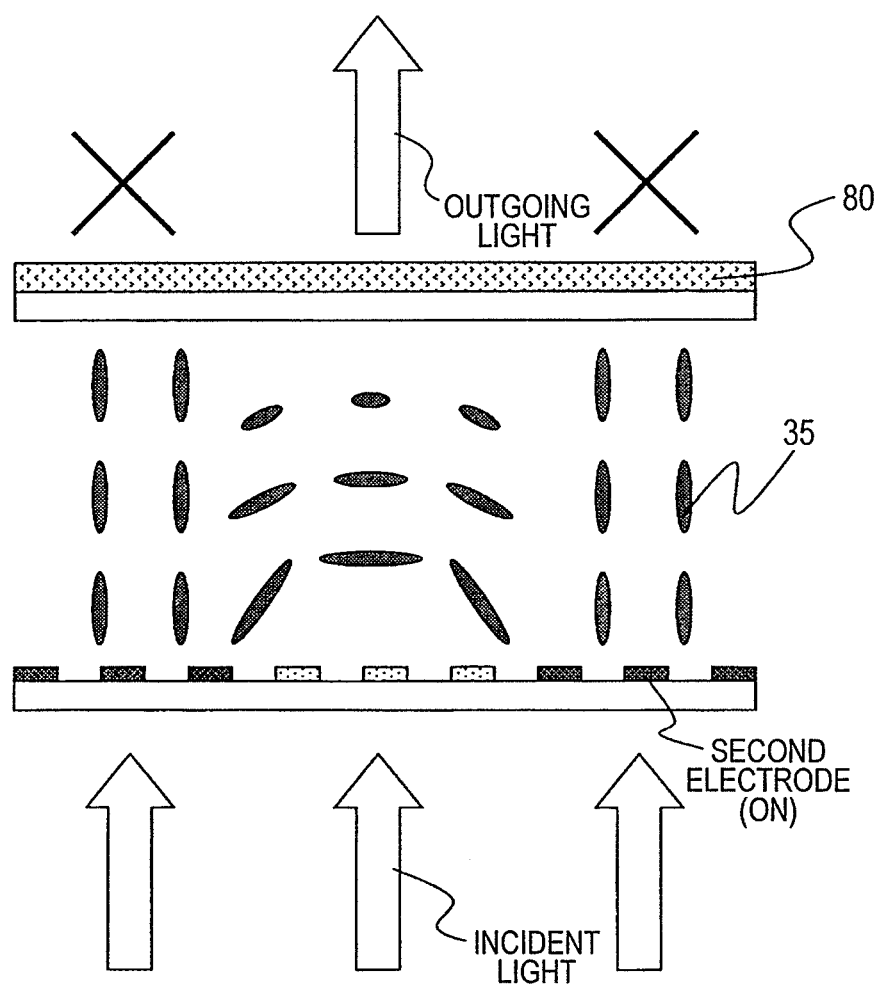
FIG. 14 is a view for explaining an operation of the liquid crystal lens, according to an embodiment 4 of the present invention.

FIG. 14 shows a condition where voltage is applied on the liquid crystal lens. Because voltage having a sufficient magnitude is applied on the second electrode (on), the liquid crystal 35 on the second electrode is oriented to be perpendicular to the substrate, i.e., the twisting is unwound or disentangled. For this reason, the rotation is lost at the place where the voltage is applied thereon, and the light is shut off.

On the other hand, in the vicinity of the center between two pieces of the second electrode (on), the liquid crystal 35 is oriented, as is shown in FIG. 14, and thereby obtaining the lens effect. In this instance, since the twisting is not yet disentangled, completely, in a region where the distribution is produce in the refractive index thereof, and then the light passes therethrough. With this structure, it is possible to obtain such the distribution of refractive index, as shown in FIG. 11.

In the embodiment 3, since the liquid crystal is oriented to be almost perpendicular to the substrate at the position of the second electrode (on), there is produced a region where the refractive index is low and constant. Because no lens effect can be obtained in this place, the crosstalk comes to be large in the embodiment 3.

On the contrary to this, in the embodiment 4, under the condition where the voltage is applied on the liquid crystal lens, in the region where no lens effect can be obtained, since the light is shut off by the polarization plate 80, then no incident light can pass therethrough. For this reason, an ill influence is affected on the crosstalk. And, through changing the place where the voltage is applied, it is possible to obtain an effect similar than that shown in FIG. 12.

According to the present embodiment, it is possible to provide the stereoscopic display apparatus, for enabling to change the position of the lens, continuously, without lowering the crosstalk.

According to the present invention, the position of the viewpoint can be moved, not only the left/right, but also in the front/back direction, with respect to the display panel, thereby widening the range from where the 3D image can be seen, and is also applicable into a display apparatus of mobile equipment, such as, a portable telephone, or a display of game or television equipment.

What is claimed is:

1. A stereoscopic display apparatus comprising:
   a stereoscopic display panel comprises a display element and a liquid crystal lens,
   the display element, which is configured to display parallax images for a left-side eye and a right-side eye, simultaneously; and
   the liquid crystal lens, which is attached onto the display element and configured to adjust a direction of a light emitting from the display element,
   wherein the liquid crystal lens comprises a first electrode made of a plane-like transparent electrode, and a second electrode having a plurality of comb-like transparent electrodes, wherein a liquid crystal layer is held between the first electrode and the second electrode,
   wherein a pitch of the liquid crystal lens is changed depending on a position of an observer with respect to the stereoscopic display panel, in front/back direction thereof,
   an observer position detecting unit, which is configured to detect the position of the observer; and
   a liquid crystal lens driving unit, which is configured to drive the liquid crystal lens,
   wherein the liquid crystal lens driving unit changes a pitch of a pattern of voltage to be applied to the plurality of comb-like electrodes of the liquid crystal lens, depending on the position of the observer, which is detected by the observer position detecting unit,
   the pitch of the liquid crystal lens is changed, by changing the pattern of voltage to be applied to the comb-like transparent electrodes, and
   wherein an individual voltage according to the pattern of voltage is applied to each of the plurality of comb-like transparent electrodes.

2. The stereoscopic display apparatus, as described in the claim 1, wherein the observer position detecting unit detects positions of eyes or a position of a face of the observer.

3. The stereoscopic display apparatus, as described in claim 1,
  wherein the observer position detecting unit further detects positions of the observer in left/right directions thereof, and
  the liquid crystal lens driving unit changes the pattern of the voltage to be applied to each of the plurality comb-like transparent electrodes of the liquid crystal lens, depending on the detected positions of the observer in the left/right direction thereof.

4. The stereoscopic display apparatus, as described in claim 1,
  wherein the pitch of the liquid crystal lens is changed uniformly.

5. The stereoscopic display apparatus, as described in claim 1,
  wherein the pitch of the liquid crystal lens is changed, by changing the pitch of the electrodes to be applied with the voltage, discontinuously.

6. The stereoscopic display apparatus, as described in claim 1,
  wherein a small distribution of refractive index is moved, little by little, within the lens pitch.

7. The stereoscopic display apparatus, as described in claim 1,
  wherein the liquid crystal lens has a polarization plate on an emitting side thereof, and rotates by 90 degrees between an axis of incident polarized light and an axis of emitting polarized light, under condition where no voltage is applied thereon, and
  the light is shut off by a liquid crystal layer and the polarization plate, on the second electrode, onto which high voltage is applied, while the light passes therethrough, on the second electrode other than that, under condition the voltage is applied thereon.

* * * * *